US011401825B2

(12) United States Patent
Calderon et al.

(10) Patent No.: US 11,401,825 B2
(45) Date of Patent: Aug. 2, 2022

(54) GAS TURBINE ENGINE CONTROL SYSTEM AND METHOD FOR LIMITING TURBINE OVERSPEED IN CASE OF A SHAFT FAILURE

(71) Applicants: Rolls-Royce Deutschland Ltd & Co KG, Blankenfelde-Mahlow (DE); Rolls-Royce plc, London (GB)

(72) Inventors: Jorge Calderon, Berlin (DE); David Brown, Derby (GB)

(73) Assignees: ROLLS-ROYCE DEUTSCHLAND LTD & CO KG, Blankenfelde-Mahlow (DE); ROLLS-ROYCE PLC, London (GB)

( * ) Notice: Subject to any disclaimer, the term of this patent is extended or adjusted under 35 U.S.C. 154(b) by 362 days.

(21) Appl. No.: 16/582,735

(22) Filed: Sep. 25, 2019

(65) Prior Publication Data
US 2020/0131918 A1    Apr. 30, 2020

(30) Foreign Application Priority Data
Oct. 29, 2018   (DE) ..................... 10 2018 126 922.6

(51) Int. Cl.
*F01D 9/00*         (2006.01)
*F02C 9/46*         (2006.01)
(Continued)

(52) U.S. Cl.
CPC ............... *F01D 9/00* (2013.01); *F01D 21/02* (2013.01); *F01D 21/04* (2013.01); *F02C 9/46* (2013.01);
(Continued)

(58) Field of Classification Search
CPC . F01D 9/00; F01D 21/02; F01D 21/04; F01D 17/162; F02C 9/46; F02C 9/54; F02C 9/20; F05D 2260/50; F05D 2270/021
See application file for complete search history.

(56) References Cited

U.S. PATENT DOCUMENTS 9,453,426 B2   9/2016   Klauke et al.
9,797,265 B2   10/2017  Soehner
(Continued)

FOREIGN PATENT DOCUMENTS

DE           3940248 A1     10/1990
DE      102012007129 A1     10/2013
(Continued)

OTHER PUBLICATIONS

German Search Report dated Jun. 28, 2019 from counterpart German App No. 102018126922.6.
(Continued)

*Primary Examiner* — Andrew H Nguyen
(74) *Attorney, Agent, or Firm* — Shuttleworth & Ingersoll, PLC; Timothy J. Klima

(57) ABSTRACT

The invention regards a gas turbine engine control system and a method for limiting turbine overspeed in case of a shaft failure. The control system includes: an overspeed protection system that activates an activation member in case a shaft failure is detected; a fuel limiting mechanism coupled with the activation member, wherein the fuel limiting mechanism is configured to limit the fuel supply to the gas turbine engine combustor if the activation member is activated; a variable stator vane mechanism which is configured to adjust variable stator vanes of a compressor of the gas turbine engine in their rotational position, the variable stator vanes having a closed position which blocks air flow through the compressor. A connecting fuel line connecting the fuel limiting mechanism and the variable stator vane
(Continued)

mechanism is provided, wherein upon activation of the activation member the fuel limiting mechanism pressurizes the connecting fuel line, thereby activating the variable stator vane mechanism to move at least one row of the variable stator vanes into the closed position.

20 Claims, 5 Drawing Sheets

(51) Int. Cl.
*F02C 9/54* (2006.01)
*F01D 21/04* (2006.01)
*F01D 21/02* (2006.01)
*F01D 17/16* (2006.01)
*F02C 9/20* (2006.01)

(52) U.S. Cl.
CPC .............. *F02C 9/54* (2013.01); *F01D 17/162* (2013.01); *F02C 9/20* (2013.01); *F05D 2260/50* (2013.01); *F05D 2270/021* (2013.01); *F05D 2270/66* (2013.01)

(56) References Cited

U.S. PATENT DOCUMENTS

| | | | |
|---|---|---|---|
| 2003/0091430 | A1 | 5/2003 | Mulera et al. |
| 2007/0289312 | A1* | 12/2007 | Daukant .................. F02C 7/22 60/779 |
| 2013/0133333 | A1 | 5/2013 | Bacic |
| 2016/0356172 | A1* | 12/2016 | DiVincenzo ............ F01D 17/02 |
| 2017/0254295 | A1* | 9/2017 | Moster .................... F02C 7/232 |
| 2017/0306856 | A1* | 10/2017 | Bickley .................... F02C 9/32 |

FOREIGN PATENT DOCUMENTS

| | | |
|---|---|---|
| DE | 102012021876 A1 | 5/2014 |
| EP | 2535525 A2 | 12/2012 |
| EP | 3236050 A1 | 10/2017 |
| GB | 2230822 | 10/1990 |

OTHER PUBLICATIONS

European Search Report dated Mar. 10, 2020 from counterpart European App No. 19205330.4.
European Office Action dated Feb. 4, 2022 from counterpart European App No. 19205330.4.

* cited by examiner

GAS TURBINE ENGINE CONTROL SYSTEM AND METHOD FOR LIMITING TURBINE OVERSPEED IN CASE OF A SHAFT FAILURE

This application claims priority to German Patent Application DE102018126922.6 filed Oct. 29, 2018, the entirety of which is incorporated by reference herein.

The invention regards a gas turbine engine control system and a method for limiting turbine overspeed in case of a shaft failure.

In the event that a shaft of a gas turbine engine breaks it is necessary to avoid an over speeding of the turbine section to prevent breaking of the turbine. Overspeed protection systems are used in this respect which automatically shut off the fuel supply to the engine combustor in case an overspeed situation is detected.

Document DE 39 40 248 A1 discloses a method for regulating a gas turbine engine in which the variable stator vanes in the compressor are adjusted to reduce the amount of air led into the engine in case an overspeed of a turbine is detected. The adjustment of the variable stator vanes takes place depending on the overspeed of the turbine. In addition, when an overspeed of the turbine is detected, the fuel supply to the engine is limited.

Document EP 2 535 525 A2 discloses a surge margin control for a gas turbine engine in which an arm signal indicating potential shaft break is generated. The system is configured to alter the variable stator vane schedule to slew each variable stator vane to decrease the available surge margin in response to the arm signal. Further, the engine is shut down by closing a fuel valve when a shaft failure signal is generated by a control system.

The family of Rolls-Royce BR700 jet engines uses a mechanical low-pressure turbine overspeed protection system which limits the fuel into the combustor in case of a shaft failure, wherein an activation element is activated in case a shaft failure is detected.

The problem underlying the present invention is to provide an improved gas turbine engine control system and method that prevent overspeed of the turbine section of the gas turbine engine in case of a shaft failure.

This problem is solved by a gas turbine engine control system and a method with features as disclosed herein. Embodiments of the invention are identified in the present disclosure.

A gas turbine engine control system for limiting turbine overspeed in case of a shaft failure is provided, wherein the control system comprises an overspeed protection system which is able to detect a shaft failure of the gas turbine engine, wherein the overspeed protection system activates an activation member such as an overspeed cable in case a shaft failure is detected. The control system further comprises a fuel limiting mechanism coupled with the activation member, wherein the fuel limiting mechanism is configured to limit the fuel supply to the gas turbine engine combustor if the activation member is activated. A variable stator vane mechanism is provided which is configured to adjust variable stator vanes of a compressor in the gas turbine engine in their rotational position, the variable stator vanes having a closed position which blocks air flow through the compressor.

A connecting fuel line connecting the fuel limiting mechanism and the variable stator vane mechanism is provided. Upon activation of the activation member the fuel limiting mechanism pressurizes the connecting fuel line, thereby activating the variable stator vane mechanism to move at least one row of the variable stator vanes into the closed position.

The invention is thus based on the idea that activation of the activation member triggers actuation of the variable stator vane mechanism to move the stator vanes into the closed position in that a connecting fuel line is extended from the fuel limiting mechanism to the variable stator vane mechanism which serves as input to the variable stator vane mechanism. In this manner, the variable stator vane mechanism is actuated via the fuel limiting mechanism.

One advantage associated with the present invention lies in an improved safety mechanism in case of a shaft failure, the safety mechanism both shutting off the fuel supply to the engine and blocking the gas path of the engine, resulting in an improved effect on restraining energy from the core of the engine. A further advantage associated with the present invention lies in an increased range of operating conditions under certification levels of safety and, as a result of the reduction of the critical overspeed condition, in a reduction in weight of the engine as critical components may be mechanically designed for less stringent conditions.

It is pointed out that once a shaft failure has been detected and the activation member has been activated, the variable stator vanes are moved in the completely closed position independent of the rotational speed of the turbine.

According to an embodiment, the fuel limiting mechanism is configured to divert pressurized fuel that under normal operating conditions is used to feed the engine combustor to the connecting fuel line if the activation member is activated. Accordingly, the fuel limiting mechanism diverts fuel to the variable stator vane mechanism through the connecting fuel line only when the activation member is activated.

It may be further provided that the fuel limiting mechanism is configured to also divert pressurized fuel that under normal operating conditions is used to feed the engine combustor to actuate a valve that limits the fuel supply to the gas turbine if the activation member is activated such that the pressurized fuel is utilized both to limit the fuel supply to the gas turbine engine combustor and to actuate the variable stator vane mechanism.

According to one embodiment, the fuel limiting mechanism comprises an emergency shut-off valve and a splitter valve, wherein upon activation of the activation member the emergency shut-off valve activates the splitter valve to limit the fuel to the combustor, wherein the splitter valve is activated by diverting to the splitter valve through the emergency shut-off valve pressurized fuel that under normal operating conditions is used to feed the engine combustor. In this embodiment, the shut-off valve his coupled to the activation member and switched to a different state when the activation member is activated. In that state, it provides fuel to a splitter valve that shuts-off the supply of fuel to the combustor and further provides fuel to the connecting fuel line that leads to the variable stator vane mechanism.

In such embodiment, it may be provided that the connecting fuel line diverts in a T-shaped diversion from a fuel line connecting the emergency shut-off valve and the splitter valve. Alternatively, separated fuel lines to the splitter valve and to the variable stator vane mechanism originate from the emergency shut-off valve.

In an embodiment of the invention, the fuel limiting mechanism is implemented in a overspeed and splitter unit which splits the pressurized fuel coming from a fuel metering unit into upper and lower fuel manifolds that feed the combustor nozzles under normal operating conditions;
limits the fuel from the fuel metering unit into the manifolds if the activation element is activated; and
pressurizes the connecting fuel line if the activation element is activated.

The activation member may be an overspeed cable that is activated by the overspeed protection system in case a shaft failure is detected. In particular, the overspeed cable may be activated by pulling the overspeed cable, such pulling motion triggering that the fuel limiting mechanism pressurizes the connecting fuel line. However, other embodiments of the activation member are possible. For example, the activation member may, alternatively, be a rod or an electronically triggered part.

According to an embodiment, the connecting fuel line is connected to the variable stator vane mechanism in a manner that pressurizing the connecting fuel line directly changes a pressure in at least one element of the variable stator vane mechanism, such pressure change effecting movement of at least one row of the variable stator vanes into the closed position. According to such embodiments, the pressure in the connecting fuel line directly causes—possibly in a chain of interacting elements—at least one row of variable stator vanes to close. For example, the connecting fuel line directly changes the pressure in a valve or an actuator of the variable stator vane mechanism.

According to another embodiment, the connecting fuel line is connected to the variable stator vane mechanism in a manner that pressurizing the connecting fuel line activates a control element, the control element controlling pressure in an element of the variable stator vane mechanism. In this embodiment, the pressure in the connecting fuel line does not directly change the pressure in an element of the variable stator vane mechanism. Rather, the pressure in the connecting fuel line that is suddenly increased when the activation member has been activated serves to activate or switch a control element that controls the pressure in an element of the variable stator vane. In particular, under the control of the switch or control element a high-pressure is applied to an element of the variable stator vane mechanism. This allows to have a higher pressure than is present in the connecting fuel line, thereby achieving quicker actuation of the element and thus quicker closure reactions. In other words, in this embodiment the pressure in the pressurized connecting fuel line serves to command a control element and not to directly increase a pressure.

The variable stator vane mechanism may comprise a control valve, an actuator, a coupling mechanism and at least one unison ring connected by levers to stator vanes, wherein the control valve controls actuation of the actuator by means of high pressure and low pressure fuel lines,
the coupling mechanism couples the actuator and the at least one unison ring, and,
the actuator actuates the coupling mechanism under the control of the control valve to adjust the at least one unison ring.

Such variable stator vane mechanism in itself are known to the person skilled in the art and described, e.g., in DE 10 2012 007 129 A1, the disclosure of which is incorporated herein by reference.

According to an embodiment, the connecting fuel line is connected to the control valve, wherein pressurizing the connecting fuel line causes the control valve to activate the actuator to move the variable stator vanes into the closed position.

In another embodiment, the connecting fuel line is connected to the actuator, wherein the actuator comprises a piston rod, and wherein pressurizing the connecting fuel line causes movement of the piston rod, such movement causing the variable stator vanes to move into the closed position. The movement of the piston rod that is caused may be an increase of the piston rod length, which leads to an adjustment of the coupling mechanism.

In another embodiment, the actuator comprises a piston rod and the coupling mechanism comprises a crankshaft, the crankshaft being connected to the piston rod and further being connected to a unison ring. The connecting fuel line is connected to a ram actuator located between the actuator and the crankshaft, wherein pressurizing the connecting fuel line causes the ram actuator to effectively change the piston rod length, thereby causing the coupling mechanism to move the variable stator vanes into the closed position. To effectively change the piston rod length means that the lengths of the piston rod itself or the length of an element coupled to the piston rod is changed.

In another embodiment, the coupling mechanism comprises a crankshaft, the crankshaft being connected to the piston rod and further being connected to at least one unison ring. The connecting fuel line is connected to a ram actuator located between the crankshaft and one of the unison rings, wherein pressurizing the connecting fuel line causes the ram actuator to move the unison ring such that the variable stator vanes connected to the unison ring are moved into the closed position. In this case, the stator vanes of a single stator vane row are closed only. However, one fully closed row of variable stator vanes is sufficient to completely block the gas path of the engine.

The above mentioned embodiments are based on a direct effect that the pressurized fuel in the connecting fuel line exercises on the variable stator vane mechanism. The following three examples are examples in which the pressurized fuel in the connecting fuel line does not directly interact with an element of the variable stator vane mechanism, but instead controls or switches a control element, wherein the control element controls the pressure in at least one element of the variable stator vane mechanism.

According to one such embodiment, an additional valve is provided which provides high-pressure fuel to the activator. The additional valve is controlled by a control element, wherein pressurizing the connecting fuel line causes the control element to switch the additional valve open such that the activator causes the variable stator vanes to move into the closed position.

According to a further such embodiment, the actuator comprises a piston rod and the coupling mechanism comprises a crankshaft, the crankshaft being connected to the piston rod and further being connected to at least one unison ring. There is further provided a ram actuator located between the actuator and the crankshaft, wherein the ram actuator has a high-pressure fluid input. The ram actuator is controlled by a control element. According to this embodiment, the connecting fuel line is connected to the control element, wherein pressurizing the connecting fuel line causes the control element to activate the ram actuator, the ram actuator when activated effectively changing the piston rod length, thereby causing the coupling mechanism to move the variable stator vanes into the closed position.

According to a further such embodiment, the coupling mechanism comprises a crankshaft, the crankshaft being connected to the piston rod and further being connected to at least one unison ring. A ram actuator is provided that is located between the crankshaft and one of the unison rings, wherein the ram actuator has a high-pressure fluid input. Activation of the ram actuator is controlled by a control element. The connecting fuel line is connected to the control element, wherein pressurizing the connecting fuel line causes the control element to activate the ram actuator, the ram actuator when activated moving the unison ring such that the variable stator vanes connected to this unison ring are moved into the closed position.

A further aspect of the present invention regards a method for limiting turbine overspeed in case of a shaft failure in a gas turbine engine which comprises an overspeed protection system which is able to detect a shaft failure of the gas turbine engine. The method comprises the steps of:
activating an activation member in case a shaft failure is detected;
upon activation of the activation member diverting pressurized fuel that under normal operating conditions is used to feed the engine combustor to effect both limitation of the fuel supply to the gas turbine engine combustor and adjustment of the variable stator vane mechanism to move at least one row of the variable stator vanes into the closed position.

The invention will be explained in more detail on the basis of exemplary embodiments with reference to the accompanying drawings in which.

Figure 1:
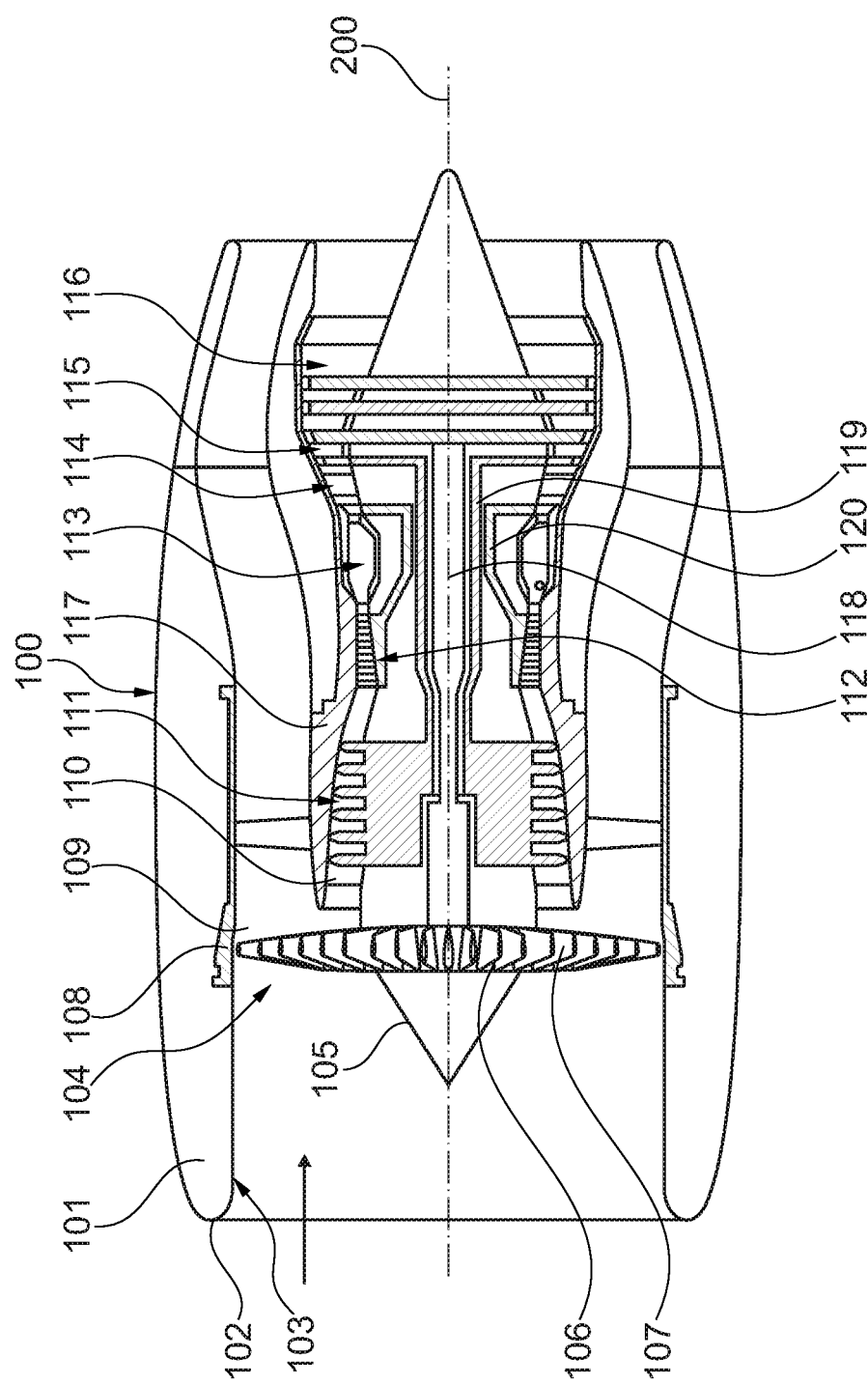
FIG. 1 is a simplified schematic sectional view of a gas engine turbine in which the present invention can be realized.
Figure 3:
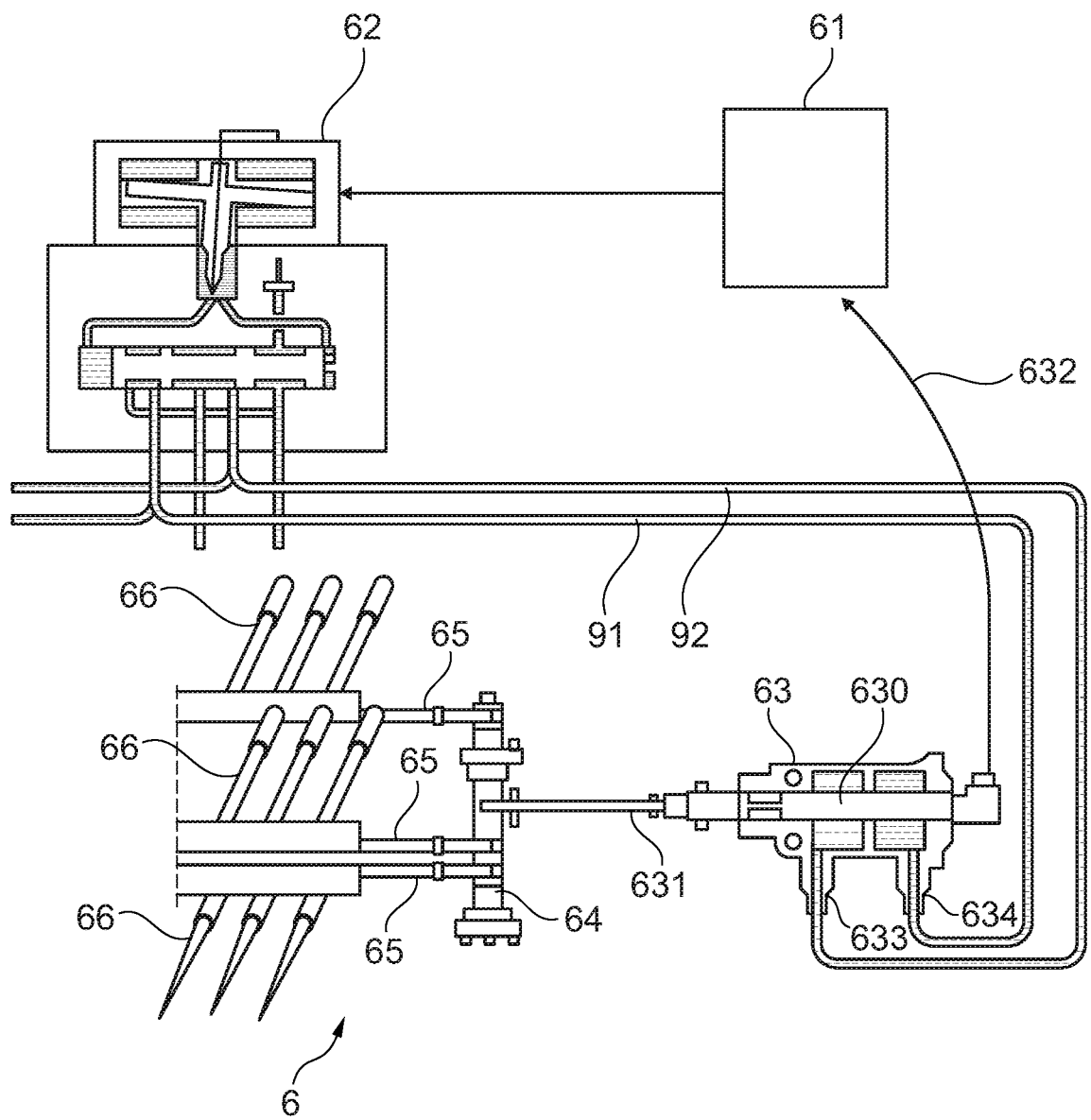
FIG. 3 shows schematically an embodiment of a variable stator vane mechanism that controls the rotational position of the vanes of at least one row of stator vanes of an engine compressor.
Figure 4:
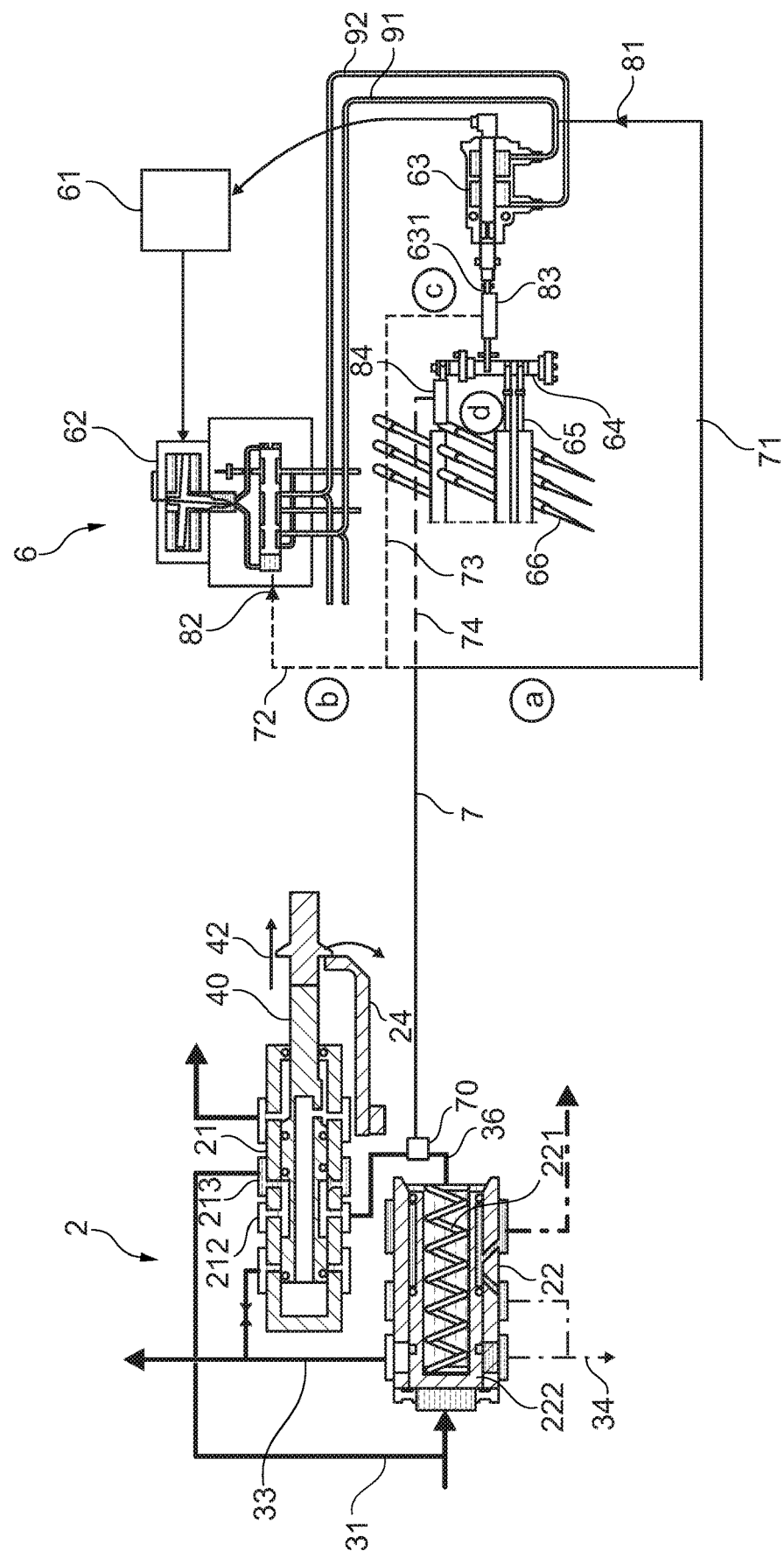
Figure 5:
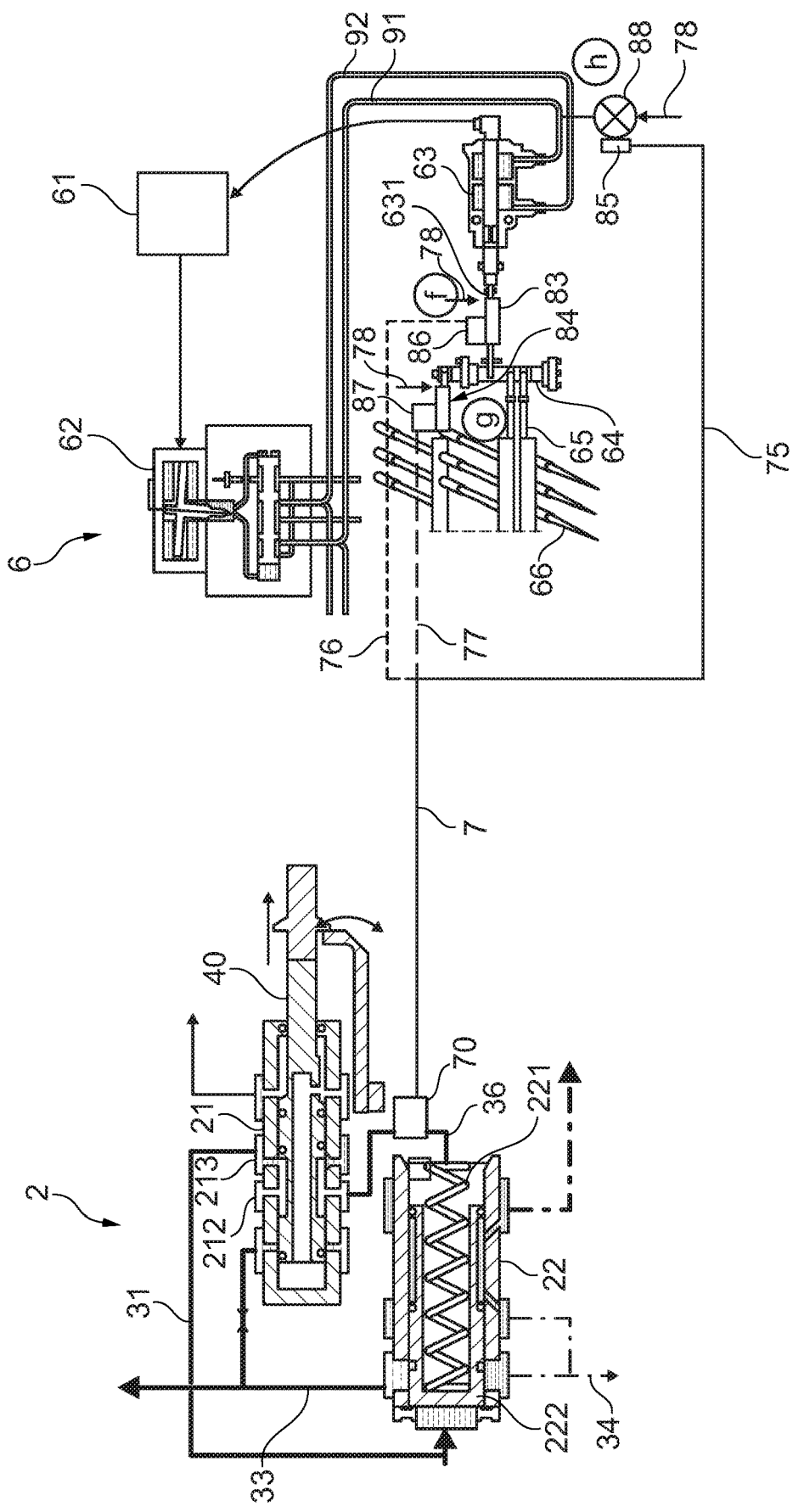

FIG. 4 shows a first embodiment of a gas engine control system in which a fuel limiting mechanism according to FIG. 1 is connected to a variable stator vane mechanism according to FIG. 3 by means of a connecting fuel line, wherein, when the connecting fuel line is pressurized, it directly changes a pressure in at least one element of the variable stator vane mechanism; and FIG. 5 shows a second embodiment of a gas engine control system in which a fuel limiting mechanism according to FIG. 1 is connected to a variable stator vane mechanism according to FIG. 3 by means of a connecting fuel line, wherein, when the connecting fuel line is pressurized, it activates a control element, the control element controlling pressure in an element of the variable stator vane mechanism.

FIG. 1 shows, in a schematic manner, a turbofan engine 100 that has a fan stage with a fan 104 as the low-pressure compressor, a medium-pressure compressor 111, a high-pressure compressor 112, a combustion chamber 113, a high-pressure turbine 114, a medium-pressure turbine 115, and a low-pressure turbine 116.

The medium-pressure compressor 111 and the high-pressure compressor 112 respectively have a plurality of compressor stages that respectively comprise a rotor stage and a stator stage. The turbofan engine 100 of FIG. 1 further has three separate shafts, a low-pressure shaft 118 that connects the low-pressure turbine 116 the fan 104, a medium-pressure shaft 119 that connects the medium-pressure turbine 115 to the medium-pressure compressor 111, and a high-pressure shaft 120 that connects the high-pressure turbine 114 to the high-pressure compressor 112. However, this is to be understood to be merely an example. If, for example, the turbofan engine has no medium-pressure compressor and no medium-pressure turbine, only a low-pressure shaft and a high-pressure shaft would be present.

The turbofan engine 100 has an engine nacelle 101 that comprises an inlet lip 102 and forms an engine inlet 103 at the inner side, supplying inflowing air to the fan 104. The fan 104 has a plurality of fan blades 107 that are connected to a fan disc 106. The annulus of the fan disc 106 forms the radially inner boundary of the flow path through the fan 104. Radially outside, the flow path is delimited by the fan housing 108. Upstream of the fan-disc 106, a nose cone 105 is arranged.

Behind the fan 104, the turbofan engine 100 forms a secondary flow channel 109 and a primary flow channel 110. The primary flow channel 110 leads through the core engine (gas turbine) that comprises the medium-pressure compressor 111, the high-pressure compressor 112, the combustion chamber 113, the high-pressure turbine 114, the medium-pressure turbine 115, and the low-pressure turbine 116. At that, the medium-pressure compressor 111 and the high-pressure compressor 112 are surrounded by a circumferential housing 117 which forms an annulus surface at the internal side, delimitating the primary flow channel 110 radially outside.

During operation of the turbofan engine 100, a primary flow flows through the primary flow channel 110, which is also referred to as the main flow channel, and a secondary flow flows through the secondary flow channel 109, which is also referred to as bypass channel, wherein the secondary flow bypasses the core engine.

The described components have a common rotational or machine axis 200. The rotational axis 200 defines an axial direction of the turbofan engine. A radial direction of the turbofan engine extends perpendicularly to the axial direction.

In the context of the present invention a control system is relevant that serves to protect the low-pressure turbine 116 in case the low-pressure shaft 118 breaks. However, the principles of the present invention similarly apply to any other turbine in a gas turbine engine of the kind shown in FIG. 1 or of any other kind.

Figure 2:
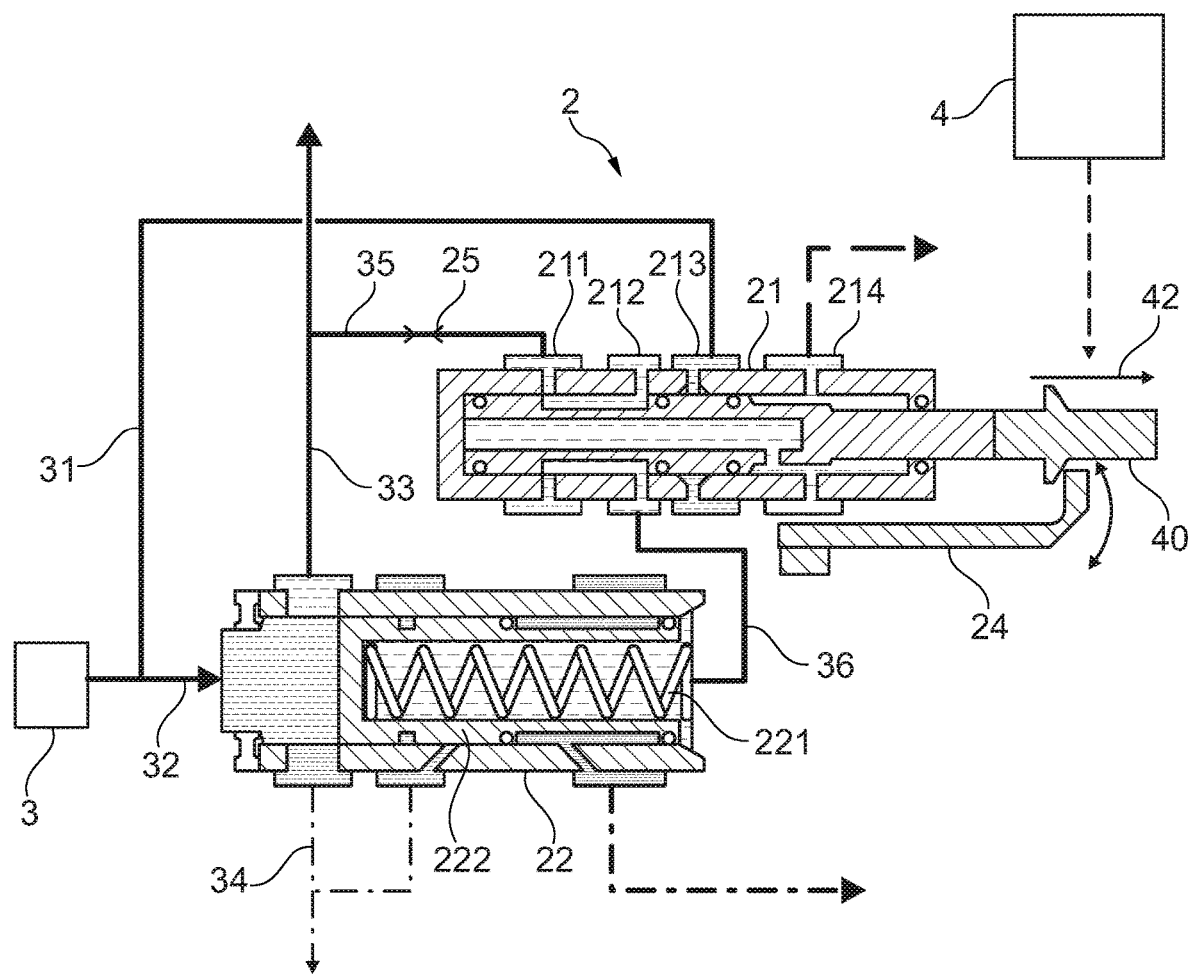
FIG. 2 shows schematically an embodiment of a fuel limiting mechanism that is coupled with an overspeed cable, wherein the fuel limiting mechanism limits the fuel supply to an engine combustor when the overspeed cable is pulled.

The control system of the present invention comprises a fuel limiting mechanism that is depicted in itself in FIG. 2 and a variable stator vane mechanism that is depicted in itself in FIG. 3, wherein the combined system is depicted in different embodiments in FIGS. 4 and 5.

FIG. 2 depicts a fuel limiting mechanism 2 which is implemented by an overspeed and splitter unit. The fuel limiting mechanism 2 comprises an emergency shut-off valve 21 and a splitter valve 22 which cooperate in providing or limiting pressurized fuel coming from a fuel metering unit 3 into upper and lower fuel manifolds that feed the combustor nozzles of a combustor.

The emergency shut-off valve 21 cooperates with an activation member which is formed by an overspeed cable 40. The overspeed cable 40 is held in a first position depicted in FIG. 2 by a detent spring 24. By activation by a schematically depicted overspeed protection system 4, which is able to detect a shaft failure of the gas turbine engine, a pulling motion 42 can be applied to the overspeed cable, thereby moving the overspeed cable 40 in a second position as will be discussed with respect to FIGS. 4 and 5.

The emergency shut-off valve 21 comprises a plurality of ports 211, 212, 213 and 214. In the first position of the overspeed cable 40 depicted in FIG. 2, the ports 211, 212 are in fluid communication.

The fuel metering unit 3 provides high-pressure fuel of a defined pressure $p_3$. The high-pressure fuel is provided through pressure line 32 to one end of splitter valve 22 from where it is split into lines 33, 34 which lead into upper and lower fuel manifolds that feed the combustor nozzles. Further, line 31 with high pressure fuel is connected to port 213 of the emergency shut-off valve 21. From line 33, a line 35 leads through a damping orifice 25 to port 211 and, as ports 211 and 212 are connected, to fuel line 36 which applies pressure to the other side of splitter valve 22. This pressure feedback provided by lines 35, 36 leads to an equilibrium state in which the pressure applied to valve 22 is such that a spring 221 moves a piston 222 of the splitter valve 22 in a position in which high-pressure fluid can flow from line 32 into lines 33 and 34.

Before discussing the fuel limiting mechanism 2 after the overspeed cable 40 has been activated, the variable stator vane mechanism in itself is discussed with respect to FIG. 3. According to FIG. 3, the variable stator vane mechanism 6 comprises an electronic control unit 61 which may be the EEC ("Electronic Engine Control") the gas turbine engine. The variable stator vane mechanism further comprises a control valve 62 and an actuator 63. The control valve 62 may be implemented as a servo valve. It provides as output a high-pressure fuel line 91 and a low-pressure fuel line 92. The amount of fuel supplied by the fuel lines 91, 92 is controlled by control unit 61. The fuel lines 91, 92 are input in ports 633, 634 of actuator 63. The pressure differential between these lines 91, 92 moves a piston 630 inside the actuator 63. The piston 630 is connected to a piston rod 631 which moves in a linear manner depending on the pressure differential between lines 91, 92. A feedback signal 632 is provided from the actuator 63 to the control unit 61.

The piston rod 631 is connected to a coupling mechanism which couples the actuator 63 with several unison rings 65, wherein each unison ring 65 is connected to a row of variable stator vanes 66. The connection between the unison ring 65 and each stator vane 66 is through a lever (not shown). The coupling mechanism comprises a crankshaft 64 which is connected to the piston rod 631. The crankshaft 64 is further connected to the unison rings 65. Accordingly, by linear movement of the piston rod 631 the unison rings 65 can be adjusted to rotate the variable stator vanes 66 in a desired position.

It is pointed out that the coupling mechanism depicted in FIG. 3 regards an exemplary embodiment only. Other embodiments of the coupling mechanism are possible. For example, embodiments of the coupling mechanism are described in documents DE 10 2012 007 129 A1 and DE 10 2012 021 876 A1, the content of which is incorporated herein by reference.

FIG. 4 shows first embodiments of a gas turbine engine control system. The control system comprises the fuel limiting mechanism of FIG. 2 and the variable stator vane mechanism of FIG. 3. FIG. 4 shows the fuel limiting mechanism of FIG. 2 in the state in which the overspeed cable 40 has been activated in that a pulling motion 42 has been applied to the overspeed cable 40. Upon activation, the detent spring 24 is flexed and the overspeed cable 40 is moved into the second position. In the second position, ports 212 and 213 of the emergency shut-off valve 21 are connected. Therefore, high-pressure fuel provided through fuel line 31 is now applied to port 212 and from port 212 through fuel line 36 to the one end of splitter valve 22. With the pressure being increased, spring 221 is extended and moves piston 222 in a position in which it blocks fuel lines 33, 34. Accordingly, the provision of fuel to the upper and lower manifolds that feed the combustor nozzles is shut-off.

The fuel limiting mechanism 2 and the variable stator vane mechanism 6 are connected by a connecting fuel line 7. The connecting fuel line 7 diverts in a T-shaped diversion 70 from fuel line 36 that connects the emergency shut-off valve 21 and the splitter valve 22. Accordingly, when the overspeed cable 40 is activated such that the pressure in fuel line 36 is increased, there is also an increase in the pressure of connecting fuel line 7. In other words, the connecting fuel line 7 is pressurized when the overspeed cable 40 is activated.

The other end of connecting fuel line 7 is connected to an element of the variable stator vane mechanism 6, wherein pressurizing the connecting fuel line 7 activates such element to the effect that at least one row of variable stator vanes 66 is moved into the closed position in which the gas path of the engine is blocked.

There exists a plurality of embodiments as to what element of the variable stator vane mechanism 6 the other end of the connecting fuel line 7 is connected to. FIG. 4 depicts four different embodiments in scenarios a, b, c and d, wherein these scenarios can be combined in all combinations. A common link of these four embodiments is that the respective elements of the variable stator vane mechanism are directly exposed to the flow and pressure in connecting fuel line 7, such that a pressure change is directly achieved by means of the connecting fuel line 7 when pressurized.

According to scenario a, the end 71 of connecting fuel line 7 is connected through a one-way valve 81 to high-pressure fuel line 91. Thereby, the pressure inside the actuator 63 is increased such that the piston rod 631 is moved in a linear manner. Such movement leads to a rotation of the crankshaft 64, which rotation moves the unison rings 65 in a position in which the variable stator vanes 66 are in the closed position which blocks airflow through the compressor.

According to scenario b, the end 72 of connecting fuel line 7 is connected through a one-way valve 82 to the servo valve 62. By similar fueldraulic means that are used in the servo valve 62, this causes the servo valve 62 to command actuator 63 to fully close variable stator vanes 66.

According to scenario c, the end 73 of connecting fuel line 7 is connected to a ram actuator 83 that is additionally provided and situated between actuator 63 and crankshaft 64. Upon pressurizing of the connecting fuel line 7, the ram actuator 83 increases the rod length of piston rod 631 sufficiently and (with enough margin) to bring the variable stator vanes 66 the closed position beyond the operable margins. This closed position will block the gas path of the engine, thereby restraining energy from the core of the engine.

According to scenario d, the end 74 of connecting fuel line 7 is connected to a ram actuator 84 that is additionally provided and situated between the crankshaft 64 and one of the unison rings 65. Pressurizing the connecting fuel line 7 causes the ram actuator 84 to increase the rod length (with enough margin) such that the respective unison ring is moved into a position such that the variable stator vanes 66 connected to the unison ring are moved into the closed position. Such closing of one row of variable stator vanes 66 is independent of the position of the actuator piston rod 631. Although one row of variable stator vanes 66 is closed only, one fully closed row can be sufficient to completely block the gas path of the engine.

As mentioned before, the previous solutions a, b, c and d can be combined with each other in any possible combination of one or several of these solutions. Each of these solutions will function in combination with one or more of the other solutions provided the connecting fuel line 7 is sized adequately. By combining solutions, each solution will contribute to the rate at which the variable stator vanes 66 are set to the closed position.

FIG. 5 depicts further embodiments the control system. The system of FIG. 5 differs from the system depicted in FIG. 4 by the manner in which the connecting fuel line 7 interacts with the variable stator vane mechanism 6. As to the components of the system, reference is made to the description of FIGS. 2 to 4. FIG. 5 depicts three different embodiments in scenarios f, g and h, wherein these scenarios can be combined in all combinations. A common link of these three embodiments is that the connecting fuel line 7 does not directly change pressure in an element of the variable stator vane mechanism, but is connected to and controls a control element, wherein the control element controls pressure in an element of the variable stator vane mechanism. Accordingly, pressurizing of the connecting fuel line is used to switch a control element to provide additional pressure to an element of the variable stator vane mechanism According to scenario f, the end 76 of connecting fuel line 7 is connected to a control element 86. Associated with and controlled by control element 86 is a ram actuator 83 (similar to ram actuator 83 of FIG. 4), wherein the ram actuator has a high pressure fluid input 78. The ram actuator 83 is located between actuator 63 and crankshaft 64. Pressurizing the connecting fuel line 76 causes the control element 86 to activate the ram actuator 83, wherein the ram actuator 83, when activated, increases the rod length of piston rod 631, thereby causing the variable stator vanes 66 to move into the closed position.

This embodiment provides for a quicker closure reaction if the pressure supplied by fluid input 78 is larger than the pressure inside connecting fuel line 7, which is the case. In particular, fluid input 78 may have the same high-pressure $p_3$ as provided by fuel metering unit 3 (see FIG. 2), while the pressure in connecting fluid line 7 may have experienced pressure losses, e.g., in T-shaped diversion 70. The higher pressure and related higher fluid flow achieve a quicker actuation of ram actuator 83 and thus a quicker closure of the variable stator vanes 66.

According to scenario g, the end 77 of connecting fuel line 7 is connected to a control element 87. Associated with and controlled by control element 87 is a ram actuator 84 (similar to ram actuator 84 of FIG. 4), wherein the ram actuator has a high pressure fluid input 78. The ram actuator 84 is located between crankshaft 64 and one of the unison rings 65. Pressurizing the connecting fuel line 77 causes the control element 87 to activate the ram actuator 84, wherein the ram actuator 84, when activated, increases a rod length, thereby moving unison ring 65 and causing the variable stator vanes 66 to move into the closed position.

This embodiment also provides for a quicker closure reaction as the pressure supplied by fluid input 78 is larger than the pressure inside connecting fuel line 7.

According to scenario h, the end 75 of connecting fuel line 7 is connected to a control element 85. Associated with and controlled by control element 85 is an additional valve 88 which has a high pressure fluid input 78. Pressurizing the connecting fuel line 7 causes the control element 85 to activate the additional valve 88 and switch it open. Thereby, the high-pressure fluid from input 78 is additionally supplied to actuator 63, thereby increasing the length of piston rod 631. Again, this embodiment provides for a quicker closure reaction as the pressure supplied by fluid input 78 is larger than the pressure inside connecting fuel line 7.

As mentioned before, the previous solutions f, g, h can be combined with each other in any possible combination of one or several of these solutions. Each of these solutions will function in combination with one or more of the other solutions provided the connecting fuel line 7 is sized adequately. By combining solutions, each solution will contribute to the rate at which the variable stator vanes 66 are set to the closed position.

It should be understood that the above description is intended for illustrative purposes only, and is not intended to limit the scope of the present disclosure in any way. Also, those skilled in the art will appreciate that other aspects of the disclosure can be obtained from a study of the drawings, the disclosure and the appended claims. All methods described herein can be performed in any suitable order unless otherwise indicated herein or otherwise clearly contradicted by context. Various features of the various embodiments disclosed herein can be combined in different combinations to create new embodiments within the scope of the present disclosure. Any ranges given herein include any and all specific values within the range and any and all subranges within the given range.

The invention claimed is:

1. A control system for a gas turbine engine control system for limiting turbine overspeed upon a shaft failure of the gas turbine engine, the control system comprising:
   an overspeed protection system, including an activation member, which is configured to detect the shaft failure of the gas turbine engine, wherein the overspeed protection system is configured to activate the activation member upon the shaft failure being detected;
   a fuel limiting mechanism coupled with the activation member, wherein the fuel limiting mechanism is configured to limit a fuel supply to nozzles of a combustor of the gas turbine engine upon activation of the activation member;
   a variable stator vane mechanism which is configured to adjust a rotational position of variable stator vanes of a compressor of the gas turbine engine, the variable stator vanes having a closed position which blocks air flow through the compressor;
   a connecting fuel line connecting the fuel limiting mechanism and the variable stator vane mechanism,
   wherein upon the activation of the activation member, the fuel limiting mechanism pressurizes the connecting fuel line, thereby activating the variable stator vane mechanism to move at least one row of the variable stator vanes into the closed position;
   wherein, upon the activation of the activation member, the fuel limiting mechanism is configured to divert the pressurized fuel that under normal operating conditions is used to feed the engine combustor to actuate at least one valve that limits the fuel supply to the nozzles.

2. The control system of claim 1, wherein, upon the activation of the activation member, the fuel limiting mechanism is also configured to divert pressurized fuel away from the nozzles and to the connecting fuel line.

3. The control system of claim 1, wherein the fuel limiting mechanism comprises the at least one valve, the at least one valve including an emergency shut-off valve and a splitter valve connected to each other by at least one further fuel line, wherein upon the activation of the activation member, the emergency shut-off valve is configured to activate the splitter valve to limit the fuel supply to the nozzles by diverting the pressurized fuel to the splitter valve through the emergency shut-off valve.

4. The control system of claim 3, wherein the connecting fuel line includes a T connection with the at least one further fuel line connecting the emergency shut-off valve and the splitter valve.

5. The control system of claim 1, wherein the fuel limiting mechanism comprises:
an overspeed and splitter unit which is configured to:
split pressurized fuel coming from a fuel metering unit into upper and lower fuel manifolds that feed the nozzles under normal operating conditions;
limit the pressurized fuel from the fuel metering unit from flowing into the upper and lower fuel manifolds upon the activation of the activation member; and
pressurize the connecting fuel line upon the activation of the activation member.

6. The control system of claim 1, wherein the activation member is an overspeed cable that is activated by the overspeed protection system upon the shaft failure being detected.

7. The control system of claim 6, wherein the overspeed cable is configured to be activated by a pulling motion to trigger the fuel limiting mechanism to pressurize the connecting fuel line.

8. The control system of claim 1, wherein the connecting fuel line is connected to a further valve, an actuator and/or a control element of the variable stator vane mechanism, wherein the pressurizing the connecting fuel line activates the further valve, the actuator or the control element to effect movement of the at least one row of the variable stator vanes into the closed position.

9. The control system of claim 1, wherein the connecting fuel line is connected to the variable stator vane mechanism such that the pressurizing the connecting fuel line directly changes a pressure in at least one element of the variable stator vane mechanism, such pressure change effecting movement of the at least one row of the variable stator vanes into the closed position.

10. The control system of claim 1, wherein the connecting fuel line is connected to the variable stator vane mechanism such that the pressurizing the connecting fuel line activates a control element, the control element controlling pressure in an element of the variable stator vane mechanism.

11. The control system of claim 1, wherein:
the variable stator vane mechanism comprises a control valve, an actuator, a coupling mechanism and at least one unison ring connected to the at least one row of the variable stator vanes,
wherein:
the control valve is configured to control actuation of the actuator by high pressure and low pressure fuel lines,
the coupling mechanism couples the actuator and the at least one unison ring, and,
the actuator is configured to actuate the coupling mechanism under control of the control valve to adjust the at least one unison ring.

12. The control system of claim 11, wherein the connecting fuel line is connected to the control valve, wherein the pressurizing the connecting fuel line causes the control valve to activate the actuator to move the at least one row of the variable stator vanes into the closed position.

13. The control system of claim 11, wherein the connecting fuel line is connected to the actuator, the actuator having a piston rod, wherein the pressurizing the connecting fuel line causes movement of the piston rod, such movement causing the at least one row of the variable stator vanes to move into the closed position.

14. The control system of claim 11, wherein:
the actuator comprises a piston rod,
the coupling mechanism comprises a crankshaft, the crankshaft being connected to the piston rod and further being connected to the at least one unison ring,
wherein the connecting fuel line is connected to a ram actuator located between the actuator and the crankshaft, wherein the pressurizing the connecting fuel line causes the ram actuator to effectively change a length of the piston rod, thereby causing the coupling mechanism to move the at least one row of the variable stator vanes into the closed position.

15. The control system of claim 11, wherein:
the coupling mechanism comprises a crankshaft, the crankshaft being connected to a piston rod and further being connected to the at least one unison ring,
wherein the connecting fuel line is connected to a ram actuator located between the crankshaft and the at least one unison ring, wherein the pressurizing the connecting fuel line causes the ram actuator to move the unison ring such that the at least one row of the variable stator vanes connected to the unison ring are moved into the closed position.

16. The control system of claim 11, and further comprising an additional valve which provides high-pressure fuel to the actuator, the additional valve being controlled by a control element, wherein the pressurizing the connecting fuel line causes the control element to switch the additional valve open such that the actuator causes the at least one row of the variable stator vanes to move into the closed position.

17. The control system of claim 11, and further comprising:
the actuator comprising a piston rod;
the coupling mechanism comprising a crankshaft, the crankshaft being connected to the piston rod and further being connected to the at least one unison ring,
a ram actuator located between the actuator and the crankshaft, the ram actuator having a high-pressure fluid input, the ram actuator being configured to be actuated by the high-pressure fluid,
a control element configured to control actuation of the ram actuator,
wherein the connecting fuel line is connected to the control element, wherein the pressurizing the connecting fuel line causes the control element to actuate the ram actuator, the ram actuator configured to effectively change a length of the piston rod upon actuation, thereby causing the coupling mechanism to move the at least one row of the variable stator vanes into the closed position.

18. The control system of claim 11, and further comprising:
the coupling mechanism comprising a crankshaft, the crankshaft being connected to a piston rod and further being connected to the at least one unison ring,
a ram actuator located between the crankshaft and the at least one unison ring, the ram actuator having a high-pressure fluid input, the ram actuator configured to be actuated by the high-pressure fluid,
a control element configured to control actuation of the ram actuator,
wherein the connecting fuel line is connected to the control element, wherein the pressurizing the connecting fuel line causes the control element to actuate the ram actuator, the ram actuator configured to move the at least one unison ring upon actuation such that the at least one row of the variable stator vanes connected to the at least one unison ring are moved into the closed position.

19. A control system for a gas turbine engine for limiting turbine overspeed upon a shaft failure of the gas turbine engine, the control system comprising:
   an overspeed protection system, including an activation member, which is configured to detect the shaft failure of the gas turbine engine, wherein the overspeed protection system is configured to activate the activation member upon the shaft failure being detected;
   a fuel limiting mechanism coupled with the activation member, wherein the fuel limiting mechanism is configured to limit a fuel supply to nozzles of a combustor of the gas turbine engine upon activation of the activation member;
   a variable stator vane mechanism which is configured to adjust a rotational position of variable stator vanes of a compressor of the gas turbine engine, the variable stator vanes having a closed position which blocks air flow through the compressor;
   a connecting fuel line connecting the fuel limiting mechanism and the variable stator vane mechanism,
   wherein upon the activation of the activation member, the fuel limiting mechanism pressurizes the connecting fuel line, thereby activating the variable stator vane mechanism to move at least one row of the variable stator vanes into the closed position;
   wherein the fuel limiting mechanism comprises:
      an overspeed and splitter unit which is configured to:
         split pressurized fuel coming from a fuel metering unit into upper and lower fuel manifolds that feed the nozzles under normal operating conditions;
         limit the pressurized fuel from the fuel metering unit from flowing into the upper and lower fuel manifolds upon the activation of the activation member; and
         pressurize the connecting fuel line upon the activation of the activation member.

20. A control system for a gas turbine engine for limiting turbine overspeed upon a shaft failure of the gas turbine engine, the control system comprising:
   an overspeed protection system, including an activation member, which is configured to detect the shaft failure of the gas turbine engine, wherein the overspeed protection system is configured to activate the activation member upon the shaft failure being detected;
   a fuel limiting mechanism coupled with the activation member, wherein the fuel limiting mechanism is configured to limit a fuel supply to nozzles of a combustor of the gas turbine engine upon activation of the activation member;
   a variable stator vane mechanism which is configured to adjust a rotational position of variable stator vanes of a compressor of the gas turbine engine, the variable stator vanes having a closed position which blocks air flow through the compressor;
   a connecting fuel line connecting the fuel limiting mechanism and the variable stator vane mechanism,
   wherein upon the activation of the activation member, the fuel limiting mechanism pressurizes the connecting fuel line, thereby activating the variable stator vane mechanism to move at least one row of the variable stator vanes into the closed position;
   wherein:
      the variable stator vane mechanism comprises a control valve, an actuator, a coupling mechanism and at least one unison ring connected to the at least one row of the variable stator vanes,
      wherein:
         the control valve is configured to control actuation of the actuator by high pressure and low pressure fuel lines,
         the coupling mechanism couples the actuator and the at least one unison ring, and,
         the actuator is configured to actuate the coupling mechanism under control of the control valve to adjust the at least one unison ring;
      the actuator comprising a piston rod;
      the coupling mechanism comprising a crankshaft, the crankshaft being connected to the piston rod and further being connected to the at least one unison ring,
      a ram actuator located between the actuator and the crankshaft, the ram actuator having a high-pressure fluid input, the ram actuator being configured to be actuated by the high-pressure fluid,
      a control element configured to control actuation of the ram actuator,
      wherein the connecting fuel line is connected to the control element, wherein the pressurizing the connecting fuel line causes the control element to actuate the ram actuator, the ram actuator configured to effectively change a length of the piston rod upon actuation, thereby causing the coupling mechanism to move the at least one row of the variable stator vanes into the closed position.

* * * * *